United States Patent [19]

Porter

[11] Patent Number: 4,681,613
[45] Date of Patent: Jul. 21, 1987

[54] SLAG FURNACE MELT FLOW CONTROL VALVE

[75] Inventor: William F. Porter, Lake Zurich, Ill.

[73] Assignee: USG Acoustical Products Company, Chicago, Ill.

[21] Appl. No.: 842,525

[22] Filed: Mar. 21, 1986

[51] Int. Cl.$^4$ .................................. C03B 37/06
[52] U.S. Cl. .................................. 65/1; 65/15; 65/19; 65/325; 65/333; 65/356; 251/205; 251/326
[58] Field of Search ........... 65/1, 15, 324, 19, 325, 65/333, 334, 356; 251/326, 205

[56] References Cited

U.S. PATENT DOCUMENTS

| | | | |
|---|---|---|---|
| 1,199,044 | 9/1916 | Beebe | 65/325 X |
| 1,566,946 | 12/1925 | Witwer | 251/326 X |
| 1,851,065 | 3/1932 | Roselle | 251/326 X |
| 2,175,407 | 10/1939 | Peiler | 65/324 X |
| 2,636,712 | 4/1953 | Lubbock | 251/326 X |
| 3,373,758 | 3/1968 | Boutwell et al. | 251/326 X |
| 3,436,023 | 4/1969 | Thalmann | 65/324 X |
| 3,511,261 | 5/1970 | Bick et al. | 251/326 X |
| 4,042,207 | 8/1977 | Nehrlich et al. | 251/326 X |
| 4,106,921 | 8/1978 | Porter | 65/14 |
| 4,463,930 | 8/1984 | Vamvakas | 251/326 X |
| 4,573,616 | 3/1986 | Shapland | 251/326 X |

FOREIGN PATENT DOCUMENTS 686955  2/1953  United Kingdom .................... 65/19

Primary Examiner—Robert Lindsay
Attorney, Agent, or Firm—Samuel Kurlandsky; Robert M. Didrick; Robert H. Robinson

[57] ABSTRACT

A valve apparatus for the precise regulation of a stream of molten material such as molten rock or slag as it issues from a primary melter or holding device, comprising a frame retaining a valve, the valve comprising a pair of plate-form valve members, one fixed and one movable with respect to the other, each having an aperture or orifice provided therein. Maximum rate of discharge occurs when the apertures are in juxtaposition, and flow cut-off occurs when the apertures are not in juxtaposition. Power operated means is provided for the movable valve member to obtain proper stream regulation or complete cut-off. The apertures are so contoured that, as the valve is moved toward closed position, the cross-sectional shape of the effective opening and the flowing stream of molten material remains substantially uniform and unchanged. Each valve member is formed of a plate of metal having an internal channel through which water is circulated to reduce the temperature of the valve member and to prevent its destruction by overheating.

10 Claims, 14 Drawing Figures

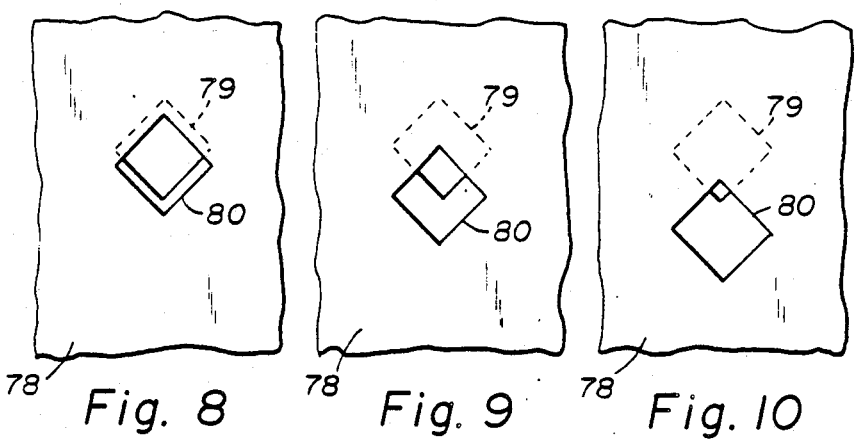
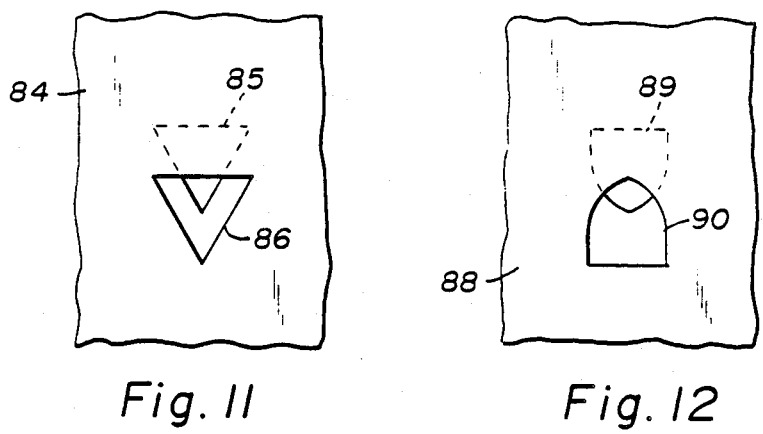
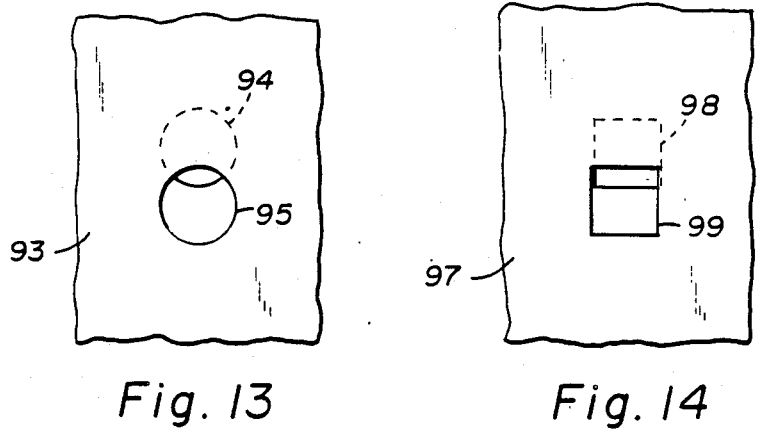

SLAG FURNACE MELT FLOW CONTROL VALVE

BACKGROUND OF THE INVENTION

1. Field of the Invention

The present invention relates to an apparatus for producing mineral fibers, and more particularly refers to a control valve for controlling the discharge of a stream of molten material such as rock or slag from the primary melter or holding device of the apparatus.

2. Description of the Prior Art

It has been conventional in the prior art to produce glass and mineral wool fibers by conveying a stream of molten material such as glass, rock or slag onto a rotating surface. The molten material is thereby centrifuged into the path of a high velocity stream formed or super heated steam or air. The centrifuged material originally in the form of finely divided molten streams is blasted by the steam or air and formed into solidified material of fibrous form. U.S. Pat. No. 4,106,921 discloses such a centrifugal rotating apparatus utilizing low pressure air to cause fiberization of the mineral fibers. In the apparatus of the prior art some difficulty has been experienced in carefully controlling the stream of molten material which is directed to the centrifugal fiberization apparatus. Moreover, because the melting of materials such as rock or slag and maintaining them at a low viscosity requires a high temperature, it has been difficult to prevent the destruction of valves used to control the melt flow. Moreover, after extended periods of operation, iron which is an impurity of the slag or rock settles to the bottom of the furnace in the form of molten metal and must be periodically drained from the furnace. The molten iron itself is very destructive of existing valve structures so that the valves must be replaced often.

SUMMARY OF THE INVENTION

It is accordingly an object of the present invention to provide an apparatus for the melting of rock and mineral slag for the production of mineral wool.

It is a further object to provide a valve structure for a furnace of the type described which can carefully control the discharge of a stream of molten material as it is discharged from the furnace or primary melter or holding device.

It is still further an object to provide a valve structure of the type described which will withstand exposure to molten slag and iron for extended periods of time without being adversely affected.

Other objects and advantages of the invention will become apparent upon reference to the drawings and details of the description.

According to the invention, an apparatus for melting mineral slag for the fiberization of mineral fibers is provided having a valve assembly in the form of a supporting frame or bracket for retaining a valve. The valve is comprised of a first valve member which is fixed, a second valve member which is movable with respect to the first valve member and means for moving the second valve member. An aperture is provided in each valve member which in the open position are juxtaposed and in the closed position are separated from each other. The apertures are so contoured that as the apertures of the valve members are moved away from juxtaposition to narrow the discharging streams, the cross-sectional shape of the stream remains unclasped and symmetrical in cross-section, and is not squeezed into a thin flat stream. The valve members each comprise a plate of a metal such as copper or aluminum having a channel provided therein for circulating water around the valve member to maintain a relatively low temperature during the melting process. The arrangement offers precise control of a molten stream being discharged from the furnace and because it is maintained at a relatively low temperature is not damaged as a result of the high temperature of the furnace.

BRIEF DESCRIPTION OF THE DRAWINGS

In the drawings:

FIG. 8 is a plan view showing the apertures of the valve members in substantially open position.

FIG. 9 is a plan view showing the apertures of FIG. 8 in a semi-closed position.

FIG. 10 is a plan view of FIG. 8 in almost completely closed position.

FIG. 11 is a plan view of the apertures in a triangular form.

FIG. 12 is a plan view showing the apertures in a parabolic form.

FIG. 13 is a plan view showing the apertures of the valve members in circular form as utilized prior to the present invention, and FIG. 14 is a plan view showing the apertures of the valve members in another form utilized prior to the present invention.

DESCRIPTION OF THE PREFERRED EMBODIMENTS

Figure 1:
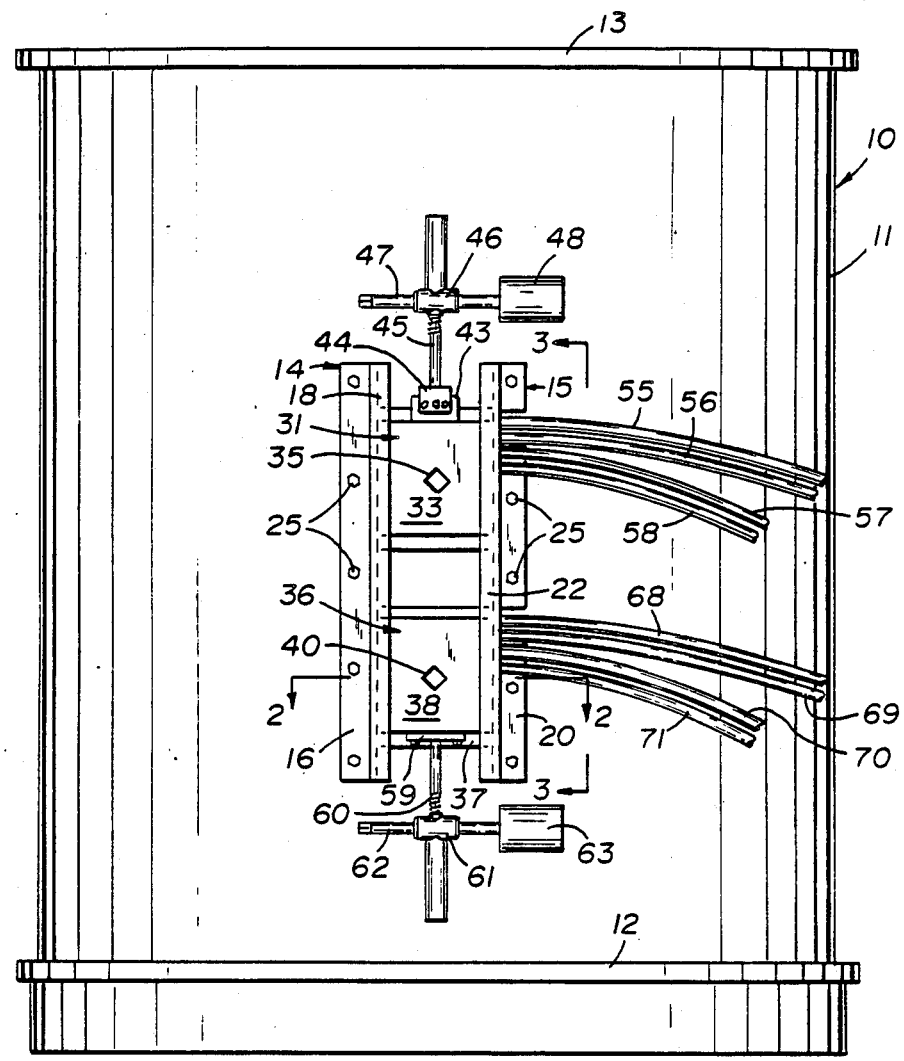
FIG. 1 is an elevational view of an apparatus according to the invention.

Referring to FIG. 1, the apparatus of the present invention is shown comprising a melting furnace 10 having a cylindrical side wall 11, a bottom 12, and a top 13. Z-form retaining rails 14 and 15 are mounted on the side wall 11. The rail 14 comprises a base 16, a web 17, and a flange 18. The rail 15 comprises a base 20, a web 21, and a flange 22. The rails are mounted on the side wall by means of shims 23 and 24, bolts 25 extending through the bases 16 and 20, and nuts 26. The shims may be altered in thickness to control the clearance between the flanges of the rails and the movable valve members.

Figure 2:
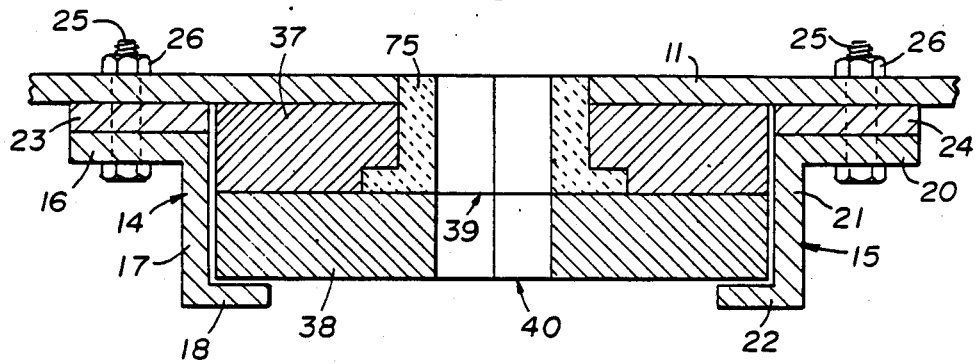
FIG. 2 is an cross-sectional view taken at the line 2—2 of FIG. 1, looking in the direction of the arrows.
Figure 3:
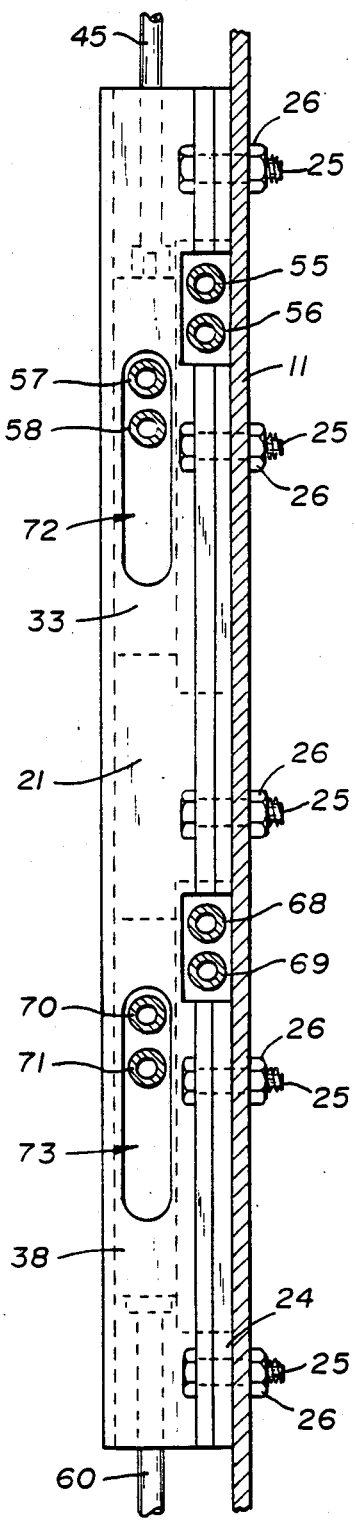
FIG. 3 is an edge view partly in cross-section of the valve apparatus taken at the line 3—3 of FIG. 1, looking in the direction of the arrows.

As shown in FIGS. 1-3, an upper valve 31 is mounted by the rails 14 and 15 and utilized to discharge molten slag. The valve 31 comprises a rectangular plate-form fixed valve member 32 and a movable valve member 33 slidably mounted thereover. The valve members 32 and 33 are provided with apertures or orifices 34 and 35, respectively. As shown in the drawings, the apertures or orifices 34 and 35 are in the form of squares having one diagonal oriented in the direction of motion of the movable valve member 33. Since the shape of the apertures is a square, the transverse diagonal is the same length as the diagonal directed in the motion of the valve member 33. As a result, as the effective opening of the valve is narrowed by movement of the movable valve member 33, the molten stream is not flattened but retains its symmetrical shape.

The lower valve 36 is utilized primarily for discharging accumulated molten iron deposits and comprises rectangular plate-form valve members including a fixed valve member 37, and a movable valve member 38 slidable over the fixed valve member. The valve members 37 and 38 are provided with apertures or orifices 39 and 40, respectively, which are also square.

A tab 43 is provided on the upper edge of the upper movable valve member 33, and is engaged by a clamp 44 affixed to a screw rod 45 journaled in a housing 46 and engaging a geared shaft 47 also journaled in the housing 46. An electrically operated motor 48 rotates the shaft 47 which in turn operates on the screw rod 45, thereby lifting and lowering the upper movable valve member 33. Alternatively, the valve member may be operated by pneumatic or hydraulic cylinders or by rack and pinion devices.

Figure 4:
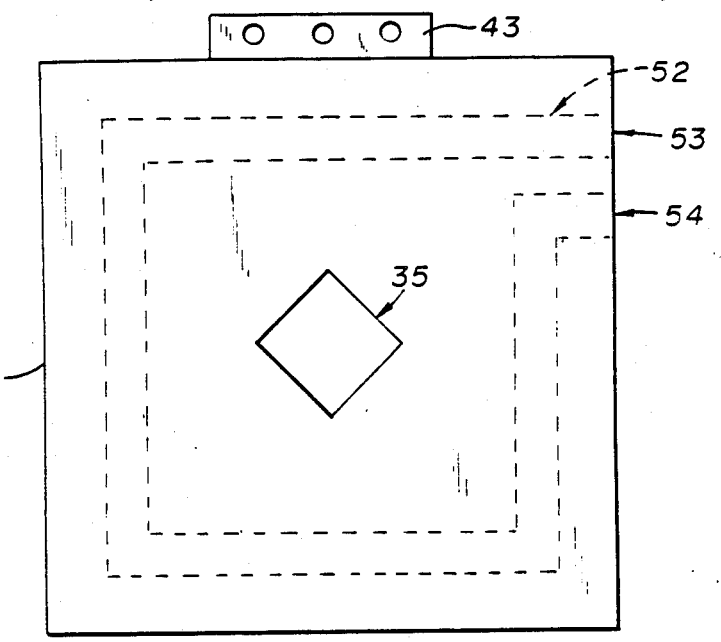
FIG. 4 is a plan view of a movable valve member of the upper valve shown in FIG. 1.

Referring to FIG. 4, the upper movable valve member 33 is shown and has a water channel or passageway 44 provided internally. The valve member 33 is preferably formed of a solid plate or block of a metal such as copper, brass, aluminum, iron or similar metals. Copper or brass is preferred for both valve members because of its high thermal conductivity. The channel or passageway 44 is formed by drilling laterally into the plate from four edges. After a continuous channel has been formed, the openings used for the drilling process are filled with plugs of metal. An inlet 53 and outlet 54 are left open in communication with the edge of the valve member.

Figure 5:
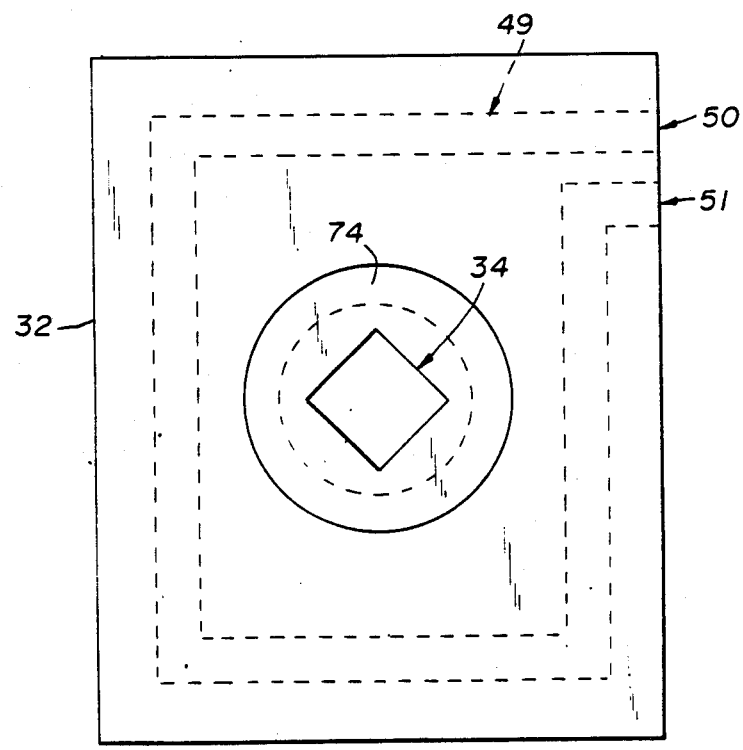
FIG. 5 is a plan view of a fixed valve member of the upper valve shown in FIG. 1.

Referring to FIG. 5, the fixed valve member 32 is shown and is of basically the same structure as that of the valve member shown in FIG. 4. A water channel or passageway 49 is provided internally in the plate in a manner similar to that of the plate member shown in FIG. 4. The same materials described with regard to the structure of FIG. 4 can also be used to make the plate member in FIG. 5. The channel 49 is provided with an inlet 50 and an outlet 51 for circulating water internally in the plate. The plate is provided with a graphite insert shown in greater detail in FIG. 2 to withstand the heat of the molten material. An aperture 76 is provided in the graphite insert.

As shown in FIGS. 1 and 3, water for circulation is provided for the fixed valve member 32 by means of copper tubes 55 and 56, the ends of which are threaded into threaded apertures provided in the valve member. Copper tubes 57 and 58 for circulating water are connected to the movable valve member 33 in similar manner. A slot 72 is provided in the web 21 of the rail 15 to permit up and down movement of the tubes when the valve member is moved up and down.

The lower valve 36 is utilized primarily for the discharge of molten residual iron which exists as an impurity in the slag and collects after continued use. For moving the lower movable valve member 38 a bar 59 is affixed to the lower edge thereof by bolts or welding. A screw rod 60 has its end affixed to the bar, the other end of the rod being journaled in a housing 61. A shaft 62 is journaled in the housing at a right angle to the screw rod 60 and is rotated by an electrically powered motor 63. The arrangement is utilized for raising and lowering the movable valve member. If desired the ends of the shafts 47 and 62 may be made square or hexagonal so that a wrench may be utilized to raise or lower the movable valve members if power should fail.

Figure 6:
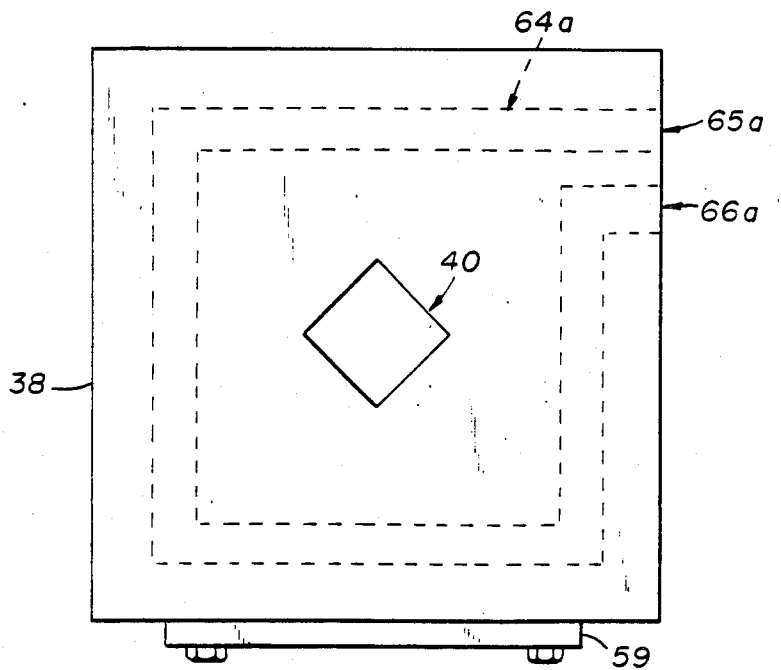
FIG. 6 is a plan view of the movable valve member of the lower valve shown in FIG. 1.

Referring to FIG. 6, the lower movable valve member is shown having a water channel or passageway 64a, an inlet 65a and an outlet 66a.

Figure 7:
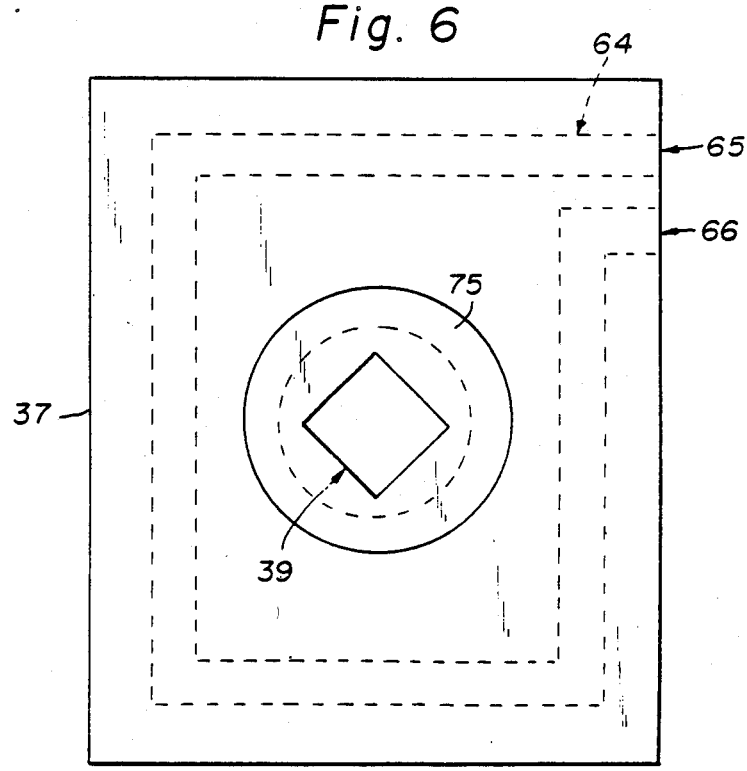
FIG. 7 is a plan view of the fixed valve member of the lower valve shown in FIG. 1.

As shown in FIG. 7, the fixed valve member 37 is provided with a water channel or passageway 64 having an inlet 65 and an outlet 66.

As shown in FIGS. 1 and 3, the lower fixed valve member 37 is provided with copper water circulation tubes 68 and 69 and the lower movable valve member 38 is provided with copper water circulation tubes 70 and 71. A slot 73 is provided in the web of the rail 15 to permit raising and lowering of the tubes when the valve member is raised and lowered. A graphite insert 75 is provided in the valve member 37 as shown in FIG. 7.

Referring to FIGS. 8, 9 and 10 the preferred form of the invention is shown. Here the valve 78 has a square aperture 79 in the fixed valve member and an identical square aperture 80 in the movable valve member. Since the movable valve member moves in the direction of one of the diagonals of the square, it can be seen that as the effective opening becomes smaller and smaller, the cross-sectional shape of the valve opening remains the same. FIG. 13 shows a valve 93 having valve members with circular apertures 94 and 95. It can be seen that as the apertures move apart and the effective opening becomes smaller, the shape of the effective opening of the valve, instead of remaining circular, is transformed into an eliptical shape, altering the stream shape and direction as it issues from the valve. This may cause the stream to oscillate back and forth, thereby making it difficult to direct the stream onto the fiberizing equipment. This is also true of the prior structure shown in FIG. 14, where the valve 97 has square apertures 98 and 99, but which are not oriented so that their diagonals are in line with the movement of the movable valve member. Here when the valve moves toward a closed position, the effective opening becomes a narrow slot, thereby interferring with the smooth and efficient discharge of the molten stream. As opposed to this, the structure and position of the apertures of FIGS. 8-10 is such that the effective opening remains uniform and of substantially the same contour as the completely open aperture, thereby producing a steady flow of the fused slag material.

FIG. 11 shows another embodiment of the present invention having a valve 84 wherein the apertures 85 and 86 are in the form of equilateral triangles. In this structure as the valve is closed the effective opening remains an equilateral triangle of substantially the same form.

FIG. 12 shows another embodiment according to the invention wherein the valve 88 has apertures 89 and 90 in the form of parabolas. If the parabolic curvature is properly chosen, as the valve is closed, the effective opening remains substantially uniform.

The melt flow control valve of the present invention has many advantages over prior art valve assemblies utilized for the same purpose. Commercial units use complex arrays of sliding elements with close tolerances and friable refractory components that are vulnerable to thermal shock. The close tolerances and the high pressure spring loading of the contact surfaces result in high friction and the need for extremely high closure force exertion. The present structure eliminates these close tolerances and utilizes water-cooled copper elements to effect precise regulation of the molten stream. Additionally, the utilization of discharge apertures in the valve members which are so contoured and oriented that as the effective opening of the valve diminishes, the original uniform shape is retained provides a distinct advantage in that the discharging stream of molten slag retains it direction of flow and does not have a tendency to waiver or oscillate from its original path when the stream becomes narrow. The resultant valve structure is low in initial cost, rugged in construction, and easily maintained.

It is to be understood that the invention is not to be limited to the exact details of construction or operations or materials shown and described, as obvious modifications and equivalents will be apparent to those skilled in the art.

The invention is claimed as follows:

1. In an apparatus including a furnace having at least one wall and adapted to heat mineral slag to a temperature above its melting point and to discharge a molten stream of said slag onto an apparatus for fiberization of the slag into mineral wool, the improvement which comprises a valve assembly including retaining bracket means affixed to said wall, and a valve mounted in said bracket means, said valve comprising a first valve member formed of a metal plate fixedly mounted in said bracket means, and a second valve member formed of a metal plate slidably mounted in said bracket means, each of said valve members having an aperture provided therein for passing molten slag, the apertures of said first and second valve members being juxtaposed in the open condition of said valve and being non-juxtaposed in the closed condition thereof, the apertures being so contoured that, as the valve members move toward closed position, the resultant effective opening of the valve retains a uniform cross-section, wherein each valve member has an internal channel provided therein for circulating water, and duct means connected thereto for transporting water to and from the internal channels of said valve members, and power-operated means for moving said second movable valve member between open and closed position, and to any intermediate position.

2. The improvement according to claim 1, wherein both apertures are in the form of squares of the same dimensions and oriented so that one diagonal of each square lies in the direction of movement of said slidably mounted valve member.

3. The improvement according to claim 1, wherein both apertures are in the form of equilateral triangles of the same dimensions and oriented so that one side is perpendicular to the direction of movement of said slidably mounted valve member.

4. The improvement according to claim 1, wherein said valve members are formed of copper.

5. The improvement according to claim 1, wherein the aperture in the fixed valve member is provided with a graphite insert having an aperture provided therein for cooperating with the aperture of said movable valve member.

6. The improvement according to claim 1, wherein said retaining bracket means comprises a pair of rails affixed one on each side of said valve assembly being Z-form in cross-section and comprising a base affixed to the wall of said furnace, a web perpendicular thereto, and a flange for engaging said movable valve member.

7. The improvement according to claim 6, wherein a slot is provided in the web of one of said rails for permitting the ducts connected to said movable valve member to move when said valve member is moved.

8. The improvement according to claim 1, wherein said ducts are copper tubes having a portion thereof in flexible condition.

9. The improvement according to claim 1, wherein a tab is provided on one edge of said movable valve member with a clamp engaging said tab and being connected to said power operated means.

10. The improvement according to claim 1, wherein said valve assembly is mounted at an elevated position of said furnace for discharging molten slag, and a second valve assembly is mounted near the bottom of said furnace having the same structure as the valve assembly of claim 1 for discharging residual molten iron which may collect at the bottom of said furnace.

* * * * *